Figure 1:
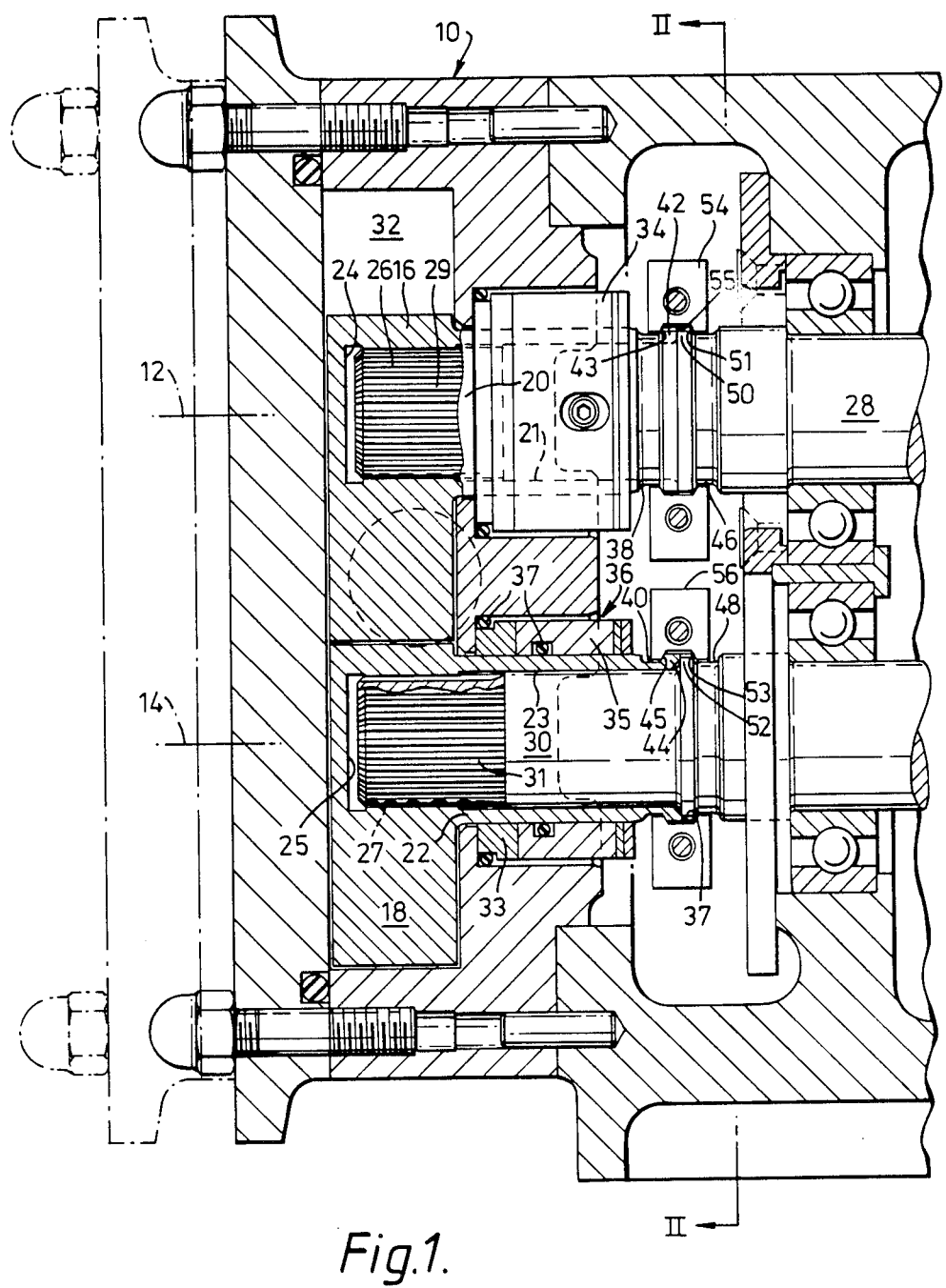

United States Patent [19]

Ellis

[11] Patent Number: 4,621,994
[45] Date of Patent: Nov. 11, 1986

[54] LOBE ROTOR PUMPS

[75] Inventor: George W. Ellis, Downley, England

[73] Assignee: SSP Pumps Limited, Sussex, England

[21] Appl. No.: 684,135

[22] Filed: Dec. 20, 1984

[30] Foreign Application Priority Data

Dec. 20, 1983 [GB] United Kingdom ............... 8333929

[51] Int. Cl.⁴ .......................................... F04C 18/02
[52] U.S. Cl. .................................... 418/206; 418/70
[58] Field of Search .............. 418/78, 178, 70, 201, 418/205, 206, 131–135; 403/338, 335, 365, 36; 411/432, 433

[56] References Cited

U.S. PATENT DOCUMENTS

| 1,167,758 | 1/1916 | Hess | 403/365 |
| 1,405,335 | 1/1922 | Rosebush | 403/365 |
| 2,303,031 | 11/1942 | Dusevoir | 403/338 |
| 3,126,834 | 3/1964 | Bursak | 418/206 |
| 3,182,900 | 5/1965 | Thorson | 418/206 |
| 3,704,968 | 12/1972 | Haupt | 418/179 |
| 4,293,290 | 10/1981 | Swanson | 418/206 |

Primary Examiner—Leonard E. Smith
Assistant Examiner—Jane E. Obee
Attorney, Agent, or Firm—Fleit, Jacobson, Cohn & Price

[57] ABSTRACT

A lobe rotor pump including a casing (10) and two lobe rotors (16, 18) the rotors each having, coaxial with its axis of rotation, an axially extending cylindrical sleeve (20, 22) formed integrally therewith. A seal (33–37) is mounted in a fluidtight manner within the casing (10) and seals against the outer cylindrical surface of the sleeve. A blind bore (21, 23), which is closed at the rotor end, (24, 25) has therewithin a drive shaft (28, 30) and retaining means (42 to 57) are provided to hold the sleeve and the rotor on the drive shaft with the drive connection engaged, said retaining means being located on the side of the seal (33–37) remote from the rotor.

3 Claims, 2 Drawing Figures

LOBE ROTOR PUMPS

DESCRIPTION

The present invention relates to lobe rotor pumps having two lobe rotors which interengage and rotate in opposite rotational senses.

The rotors of lobe rotor pumps are usually each mounted on the drive shaft by providing splines on the shaft and cooperating splines on the rotor and the shaft extends right through the rotor and is secured thereon, usually by means of a nut or a plate provided with a bolt which is screwed into a bore in the end of the shaft. The problem with such an arrangement, particularly when the pump pumps at a significant pressure, is that some of the pumped fluid can pass into the splines and between the nut and shaft end or plate and shaft end, and between the rotor and a shoulder which is usually formed on the shaft. Even the provision of O-rings does not provide a satisfactory cure to this problem. Although in many pump usages this does not matter, it can be a problem where one is using the pump in the food or drug industry or in photographic processing where the inclusion of any foreign matter which might accidentally be forced into the splines or into a keyway can contaminate a subsequent product being pumped.

It has been proposed in centrifugal pumps to provide the rotor with an integral cylindrical sleeve and to form a blind bore through the sleeve and into the rotor, with an internal thread in the bore into which the threaded end of the drive shaft can be screwed. However, it would not be practical to provide such a system on a lobe rotor pump with two interengaging rotors, because after the manufacture of such a pump, when one wishes to remove the rotors to service or replace the seals, it would be impossible to do so without almost completely taking the pump to pieces because of the interengagement of the rotors.

Furthermore, while such a threaded construction may be satisfactory for centrifugal pumps, which are designed to operate in one rotational sense only, it would not be suitable for a lobe rotor pump which is usually designed to operate in either sense to give a reverse pumping ability, because the rotors would tend to unscrew and jam if operated in the reverse sense.

It is now proposed to provide a lobe rotor pump comprising a casing, a pair of lobe rotors mounted for contrarotation about parallel axes within said casing, an integral sleeve formed on each rotor so as to be coaxial therewith, each said sleeve having an outer cylindrical surface, an end adjoining the rotor and a free end remote therefrom, a blind bore extending through each sleeve towards the rotor integral therewith, said blind bore being open at the free end of the sleeve and closed at its other end, a seal arrangement mounted within the casing and in sealing contact with the outer cylindrical surface of each sleeve, a pair of drive shafts each having an end portion extending into one of said blind bores, a positive rotational drive connection between the end portion of each drive shaft and the blind bore in which it is engaged, said drive connection being operable in either rotational sense and a separate retaining means to retain each sleeve and its driven shaft in axial engagement, each retaining means being located on the side of the associated seal arrangement remote from its rotor.

With such a construction, the provision of an axially extending sleeve which is formed integrally with the rotor enables the retaining means to be located on the remote side of the pump seal from the pumping chamber proper. If the seal is reasonably efficient, as such seals normally are, then there is little or no chance of a contaminating fluid becoming lodged in the spline or keyway which is used as the drive connection between the shaft and the rotor. Thus the pump can be operated in a fully hygienic manner.

The retaining means for each shaft may take many forms. For example they could comprise a groove formed in the drive shaft and one or more grub screws passing through the sleeve and engaging in this groove, or they could comprise a bolt passing through the sleeve and through the shaft.

However, lobe rotor pumps produce a substantial positive pressure on one side of the "nip" between the rotors and a negative pressure on the other side. This produces a substantial bending stress in the shaft and it would be unwise to weaken the shaft by forming a bore through the shaft and sleeve. Thus, in a preferred construction, the retaining means comprise an outwardly projecting annular shoulder on the shaft, an outwardly projecting annular shoulder on the sleeve, adjacent the shoulder on the shaft, and a clamp ring having an internal groove engaging over each of said shoulders.

In one preferred arrangement, the clamp ring comprises two semi-circular halves and means urging said halves towards one another and at least one of the annular shoulders is provided with a chamfer and the cooperating surface of the groove in the ring has a complementary chamfer, whereby when said halves are urged towards one another, the shoulders are forced into engagement.

The rotary drive connection may comprise a key and keyway on each shaft and in each bore or they could comprise splines formed on the drive shafts, for example at the end, and complementary splines formed in the bores preferably within the rotors. Alternatively the connection could be provided by forming a complementary taper on the ends of the shafts and in the bores. It is also contemplated that the shafts and rotors could be secured by adhesive, but this solution would not be very satisfactory as it would be difficult to remove the rotors for servicing.

The seal arrangement could take any form, for example a conventional mechanical seal or a packing gland. In some food and drug industry uses, the packing gland is preferred because it can be designed to provide a controlled limited leakage flow rate, which is slightly in excess of the bacterial growth rate, thereby effectively flushing any bacteria away and thus preventing them from entering the pump.

Figure 2:
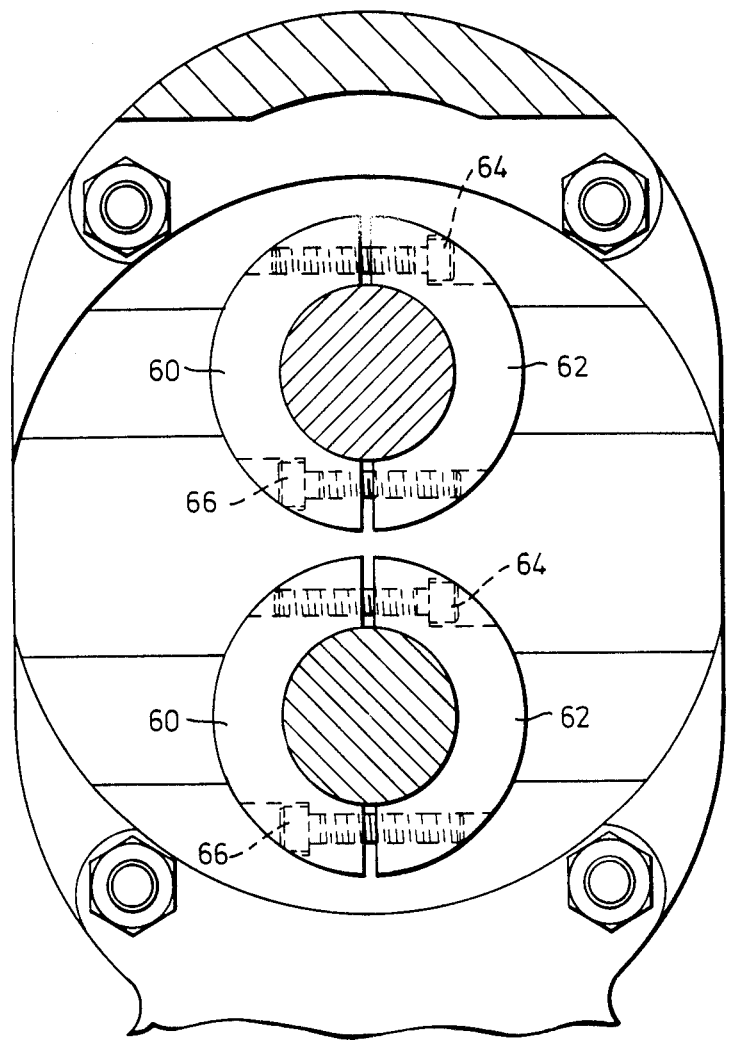

In order that the invention may more readily be understood, the following description is given, merely by way of example, reference being made to the accompanying drawings, in which:

FIG. 1 is a cross-section through one embodiment of lobe rotor pump according to the invention; and FIG. 2 is a section on line II—II of FIG. 1.

Referring first to FIG. 1, there is illustrated a pump including a casing 10 having, mounted for rotation therein, about spaced parallel axes 12 and 14, two lobe rotors 16 and 18. Each rotor is provided with an axially extending integral sleeve 20, 22, the sleeves having bores 21, 23 respectively therein which are blind, being closed at the ends 24, 25 respectively. Adjacent the closed end, each bore is provided with internal splines 26, 27.

Inserted within the bores 21, 23 are two drive shafts 28, 30 which have reduced diameter portions 29, 31 respectively which are provided with external splines adapted to cooperate with the splines 26, 27 in the bores. This provides a rotational drive connection between the drive shaft 28, 30 and the respective rotor 16, 18 which can operate in either direction of rotation. The shafts are provided with gearing (not shown) to cause the two rotors to contra-rotate.

Mounted to provide fluidtightness in the pumping chamber 32 in which the rotors can rotate are shaft seal arrangements 34, 36 respectively.

The seal arrangements are identical and only the lower one is shown in section and comprises a mechanical seal element 33 carried by the casing abutting a further mechanical seal 35 on the sleeve and the seal rings 33 and 35 being provided with O-rings 37.

It will be seen that axially outwardly of the seals 34, 36 the sleeves are provided with grooves 38, 40 defining outwardly projecting annular shoulders 42, 44 having chamfered surfaces 43, 45 respectively. The two shafts are also provided with grooves 46, 48 again to define an annular shoulder 50, 52 which has a chamfered surface 51, 53 respectively.

Embracing the two pairs of shoulders 42, 50 and 44, 52 are two clamp rings 54, 56 having an internal groove 55, 57 provided with internal chamfers which are complementary to the chamfers 43, 45, 51, 53.

As can be seen more clearly in FIG. 2 which illustrates clamp ring 54 only, each ring comprises semicircular halves 60, 62 which can be urged towards one another by bolts 64, 66. Thus, as the bolts are tightened up, the clamp halves are pushed towards one another and the cooperating chamfers draw the two shoulders into closer abutting relation, thereby to retain the drive shaft firmly in the bore in the sleeve/rotor, and thereby maintain the inter-engagement of the splines.

It will be appreciated that the clamping arrangement is therefore located wholly outside the seal area defined by the seals 34, 36 and that there is little likelihood of fluid being pumped passing to this seal area and thereby providing the possibility of contamination upon subsequent use of the pump.

While the sleeves 20, 22 have been shown as formed wholly integrally, i.e. machined out of the same piece of metal, they could be formed separately and secured by welding or the like.

I claim:

1. A lobe rotor pump for use in an non-contamination environment, comprising, in combination:
   (a) a metal casing;
   (b) a pair of interengaging lobe metal rotors mounted for contrarotation about parallel axes within said casing;
   (c) an integral cylindrical sleeve formed on each rotor so as to be coaxial therewith, each said sleeve having an outer cylindrical surface, an end adjoining the rotor and a free end remote therefrom;
   (d) a blind bore extending through each sleeve towards the rotor integral therewith, said blind bore being open at the feed end of the sleeve and closed at its other end;
   (e) a seal arrangement mounted within the casing and in sealing contact with the outer cylindrical surface of each sleeve, a part of each sleeve extending axially beyond its associated seal arrangement on the side thereof remote from its rotor;
   (f) a pair of drive shafts each having an end portion extending into one of said blind bores;
   (g) splines formed on an end portion of each drive shaft and complementary splines formed within the portion of said bores formed within said rotors themselves; and
   (h) separate retaining means engaging the exterior surface of each of said sleeve parts and an adjacent part of its drive shaft effective to retain each sleeve and its drive shaft in axial engagement, each retaining means being located wholly on the side of the associated seal arrangement remote from its rotor said means being the sole means to retain said rotor on said drive shaft.

2. A lobe rotor pump as claimed in claim 1, wherein said separate retaining means for each rotor comprises an outwardly projecting annular shoulder on each shaft, an outwardly projecting annular shoulder on each sleeve, adjacent the shoulder on each shaft, and a clamp ring having an internal groove engaging over each of said adjacent shoulders.

3. A lobe rotor pump as claimed in claim 2, wherein said clamp ring comprises two semi-circular halves and means for urging said halves together and further comprising a chamfer on at least one of said annular shoulders and a chamfer on the cooperating surface of said groove, whereby, when said halves are urged together, the shoulders are urged axially towards one another.

* * * * *